United States Patent [19]

Yasuki et al.

[11] Patent Number: 5,019,902

[45] Date of Patent: May 28, 1991

[54] BAND WIDTH COMPRESSING/REPRODUCING SYSTEM WITH FIELDS FOR DIFFERENT FREQUENCY COMPONENTS

[75] Inventors: Seijiro Yasuki, Yokohama; Kiyoyuki Kawai, Yokosuka, both of Japan

[73] Assignee: Kabushiki Kaisha Toshiba, Kawasaki, Japan

[21] Appl. No.: 388,055

[22] Filed: Aug. 1, 1989

[30] Foreign Application Priority Data

Aug. 23, 1988 [JP] Japan ................................. 63-207441

[51] Int. Cl.$^5$ .............................................. H04N 7/12
[52] U.S. Cl. ..................................... 358/133; 358/141
[58] Field of Search ................. 358/133, 141, 140, 12, 358/105, 142, 146

[56] References Cited

U.S. PATENT DOCUMENTS

| | | | |
|---|---|---|---|
| 4,485,401 | 11/1984 | Tan .................................. | 358/12 X |
| 4,621,287 | 11/1986 | Reitmeier et al. .................. | 358/141 |
| 4,855,811 | 8/1989 | Isnardi .............................. | 358/141 |
| 4,888,641 | 12/1989 | Isnardi et al. ..................... | 358/141 |
| 4,897,722 | 1/1990 | Flory ................................. | 358/141 |

OTHER PUBLICATIONS

K. Kawai, S. Yasuki, N. Sakamoto. "A Foundmental Study of 3 Dimensional Frequency Division Multiplexing", ITEJ TEchnical Report vol. 12, No. 30, pp. 55-60, 1988.

Primary Examiner—Victor R. Kostak
Attorney, Agent, or Firm—Oblon, Spivak, McClelland, Maier & Neustadt

[57] ABSTRACT

At a time of band width compression, an input signal is separated into a horizontal high frequency component H and a horizontal low frequency component L by means of an LPF and an adder. The component H is subjected to in-frame averaging by an in-frame average circuit. The component L is delayed by one field by a field delay circuit which contains a component to provide smooth motion. The delayed output is added to the in-frame average output in one field by an adder. In the other field, a difference in the horizontal low frequency component between fields is attained by a field delay circuit and an adder. Accordingly, in one field a signal containing the component L and the component H subjected to in-frame averaging is attained. In the other field, a signal containing only the component L having gone through a process of obtaining the field-to-field difference is attained. At a time of band width reproduction, an input signal is output as it is in one field through two switch circuits. In the other field, the input sighnal is added to an input signal in the former field by a field delay circuit and an adder. The added output is transferred through a switch.

13 Claims, 11 Drawing Sheets

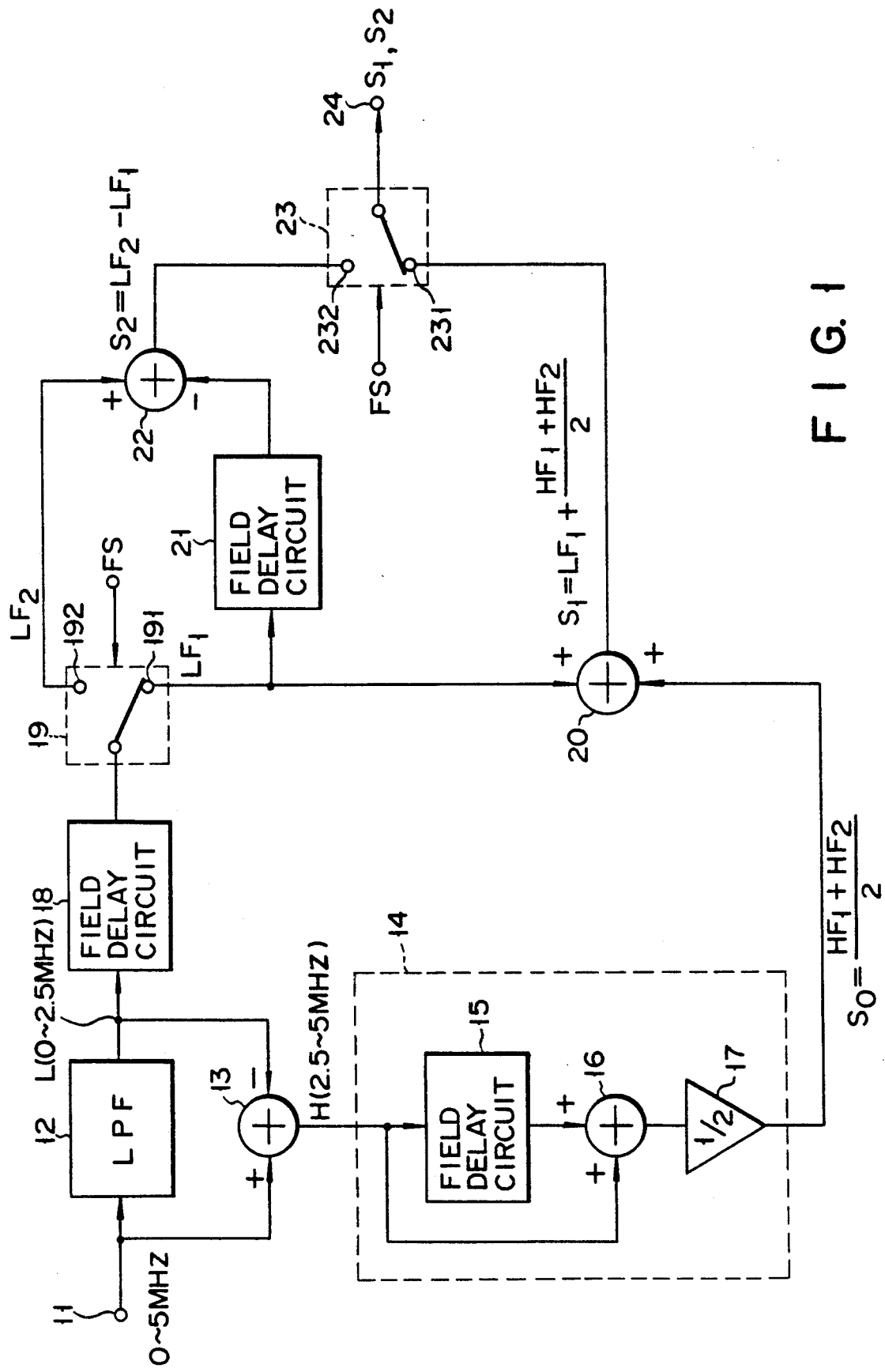
F I G. 1

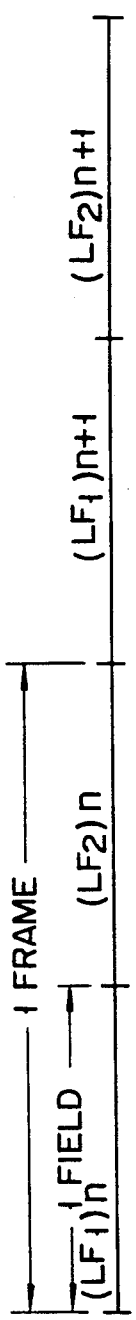
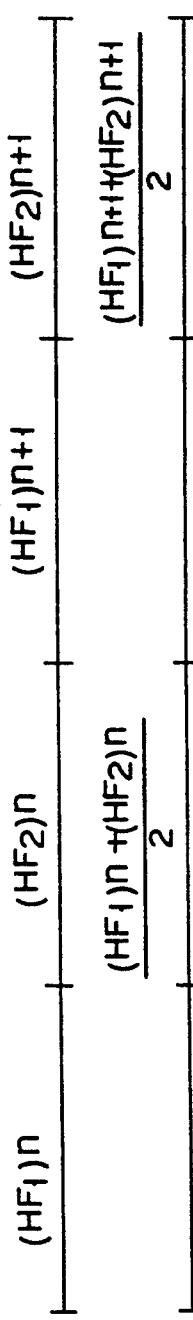
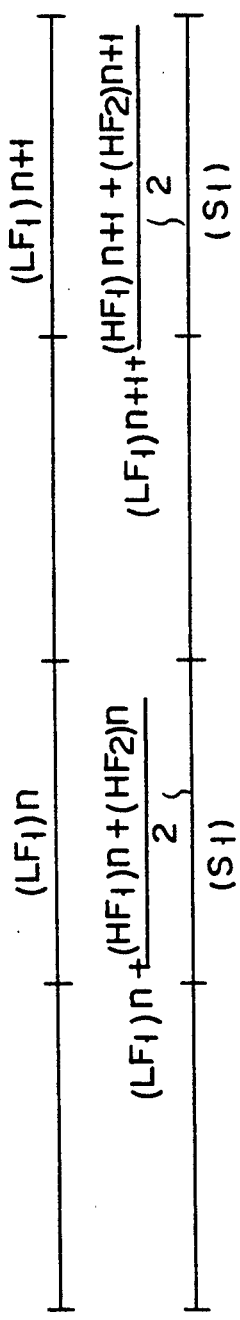
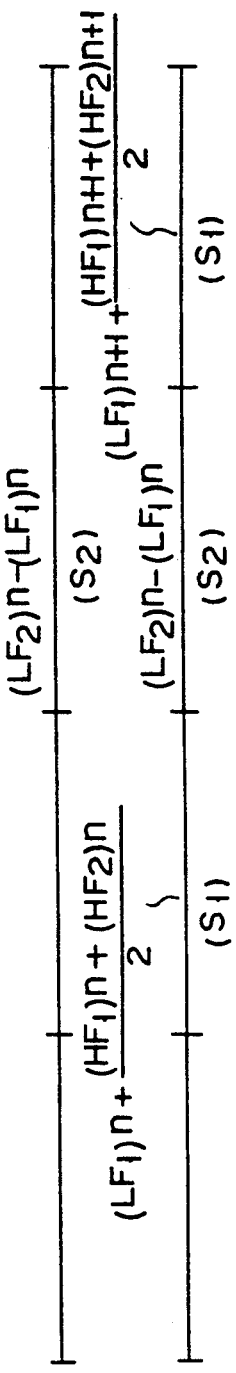
FIG. 4A
FIG. 4B
FIG. 4C
FIG. 4D
FIG. 4E
FIG. 4F
FIG. 4G
FIG. 4H

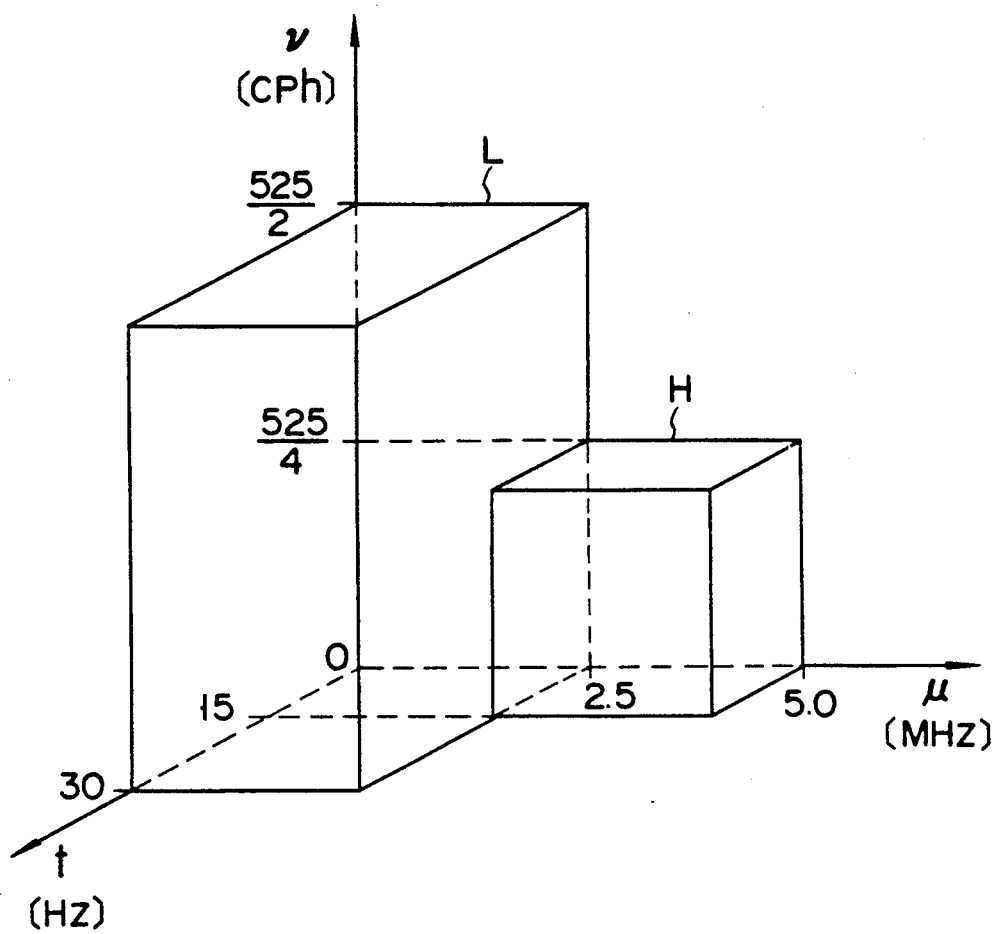
F I G. 5

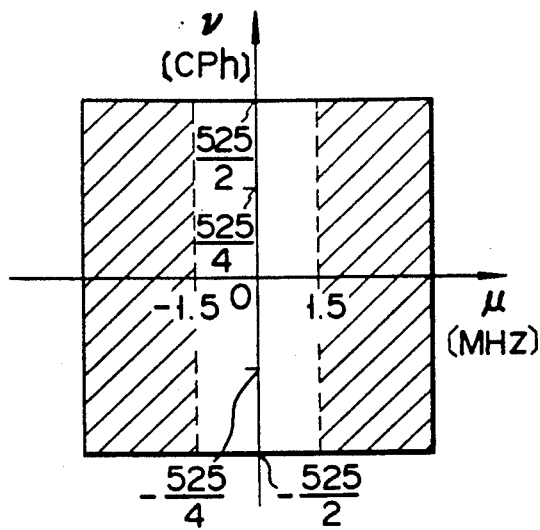
F I G. 12A
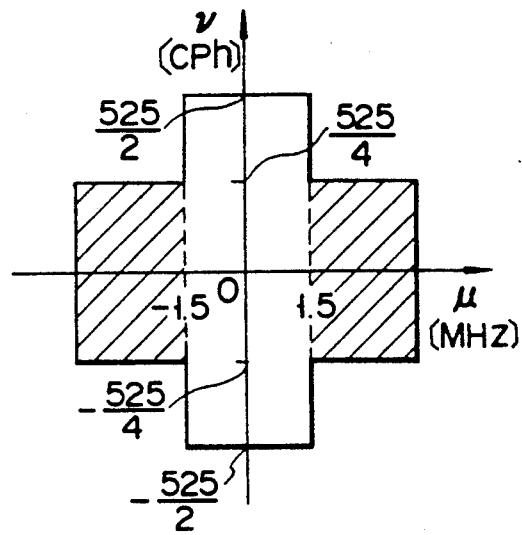
F I G. 12B
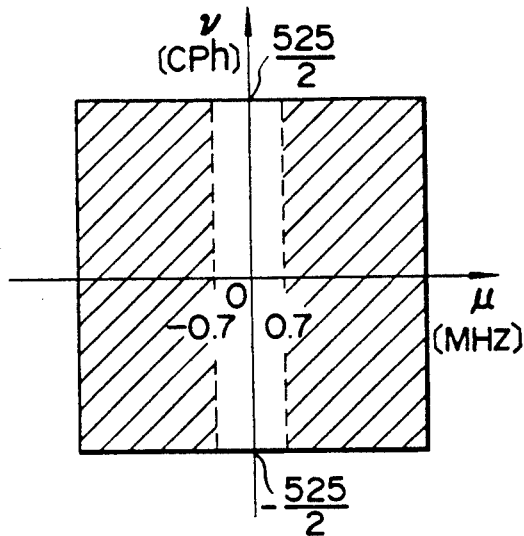
F I G. 12C
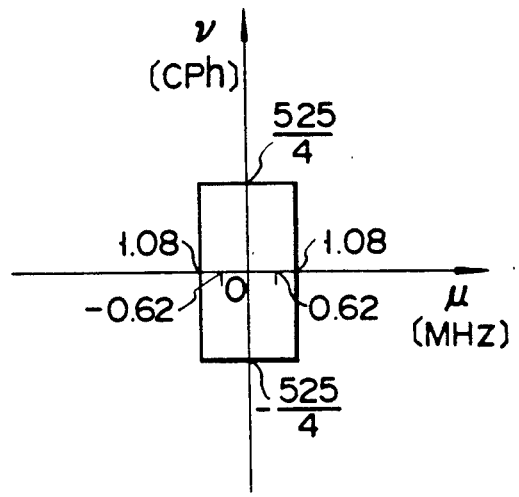
F I G. 12D
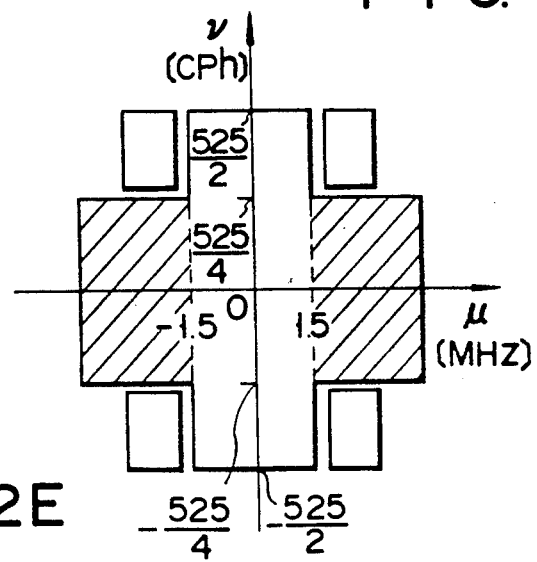
F I G. 12E

BAND WIDTH COMPRESSING/REPRODUCING SYSTEM WITH FIELDS FOR DIFFERENT FREQUENCY COMPONENTS

BACKGROUND OF THE INVENTION

1. Field of the Invention

The present invention relates to a bandwidth compressing/reproducing system which subjects a television signal to bandwidth compression and then subjects the bandwidth-compressed television signal to bandwidth reproduction.

2. Description of the Related Art

The NTSC system is one of color television broadcast systems. This NTSC system can be considered an excellent system as it has a compatibility with a monochromatic television broadcast system and has a sufficient performance as a color television broadcast system. This is proved by its employment in Japan, the U.S.A. and other countries.

The image quality in the NTSC system has been significantly improved since the one achieved in the beginning due to great efforts having made continuously by both sender and receiver sides in its own long history.

As a recent trend toward larger display devices, however, there is a growing demand for still higher image quality in the NTSC system.

An IDTV (Improved Definition Television) system, for example, serves to improve image quality in the NTSC system. This IDTV system improves image quality by effectively using a transmitted color television signal of NTSC system (hereinafter referred to as NTSC signal). The IDTV system can be realized by the recent progress in digital technique.

The IDTV system can significantly improve image quality as compared with the conventional analog system.

Since the IDTV system is premised on the NTSC system, however, the improvement on image quality is regretfully restricted by the standards of the NTSC system.

The following are examples of the restrictive items:
(1) Horizontal to vertical screen ratio (aspect ratio).
(2) Horizontal resolution.

According to the current NTSC system, the aspect ratio (1) is 4 : 3; therefore, the aspect ratio for the IDTV system is also restricted to 4 : 3.

The horizontal resolution (2) is 330 TV lines due to the horizontal bandwidth of the current NTSC system being restricted to 4.2 MHz. The IDTV system inevitably has a restricted horizontal resolution of 330 TV lines.

With regard to the aspect ratio (1), recent surveys indicate that users prefer a ratio of 5 : 3 or 16 : 9. (See "Broadcast System," edited by Nippon Hoso Kyokai (NHK), page 80.) There is a possibility of employing an aspect ratio of 16 : 9 in the HDT (High Definition Television) system (see CCIR Report 801-2).

The horizontal resolution (2) should be improved in order to maintain the balance with the current vertical resolution. Because the vertical resolution can be improved up to 450 TV lines by the IDTV system.

From the above, it is desirable to improve the aforementioned two restrictive items while keeping the compatibility with the current NTSC system.

An example of such a system is the SLSC system as disclosed in "A Compatible High-Definition Television System (SLSC) with Chrominance and Aspect Ratio Improvements," by Joseph L. LoCicero, SWPTE Journal, May 1985.

According to this SLSC system, there are bands for two channels per station provided: one channel transfers a signal basically similar to the current television signal and the other transfers a added signal for improvement of image quality.

As two channels are specifically used per station according to this system, the efficiency in channel use is not high. Particularly, with channel assignment being close to its limit as in Japan, difficulties apparently lie in utilizing such a system. With regard to in-station or station-to-station transfer, existing television broadcast machines do not have bandwidths of 10 MHz as defined by the SLSC system, thus necessitating investment in new equipments.

In this respect, it is desirable to use a system which can transfer an added signal within a one-channel bandwidth. Further, in view of the compatibility of the existing television broadcast machines such as video tape recorders and transmitters, it is desirable that the broadcast system can multiplex an added signal around a base bandwidth of 4.2 MHz.

Such a system is disclosed in "Extended Definition TV Fully Compatible with Existing Standards," by T. Fukinuki et al., IEEE Tr. on Communication Vol. COM-32 No. 8, August 1984. The disclosed system uses a spectrum region unused for a still picture to multiplex a detail component of luminance (component with a horizontal bandwidth of about 4 to 6 MHz) onto an NTSC signal, in order to improve the resolution of a still picture. As the unused spectrum region, a predetermined region in the first or third quadrant in a two-dimensional display in the vertical (v) and time (t) directions would be used.

However, this system cannot be utilized in multiplexing an added signal for increasing the aspect ratio, because the added signal should be transferred for a motion picture. In the case of a motion picture, as the spectrum spreads in the time direction. If an added signal is multiplexed, therefore, it will be superimposed on the intrinsic NTSC signal, the added signal cannot be separated at the receiver side.

It is thus desirable to use a system which can transfer an added signal even for a motion picture. This system is disclosed in, for example, "Encoding for Compatibility in the ACTV System," by M. A. Isnardi et. al, IEEE Trans. on Broadcasting Vol. BC-33 No. 4 1987, pages 116-123.

This ACTV system subjects a main signal and an added signal to bandwidth compression to ensure multiplexing of the added signal for not only a still picture but also a motion picture.

Since the ACTV system significantly restricts the bandwidth in the vertical (v) and time (t) directions of the main signal and added signal, however, a reproduced image is likely to show unnatural motion or degradation of the vertical resolution. Specifically, according to the ACTV system the vertical upper limit frequency of a component of the main signal above 1.5 MHz is restricted to 525/4 (cph), a half of that involved in the NTSC system, in the case of a still picture (time frequency being 0 Hz). This also applies to a motion picture, and the vertical upper limit frequency in this case will be 0 (cph) with the time frequency being 15 Hz. According to the ACTV system, therefore, a reproduced image would be blurred due to a decrease in the diagonal resolution for a still picture and would significantly lose smooth movement for a motion picture.

SUMMARY OF THE INVENTION

Accordingly, it is an object of the present invention to provide a bandwidth compressing/reproducing system which can subject a television signal to bandwidth compression to thereby eliminate unnatural motion (so called motion-jerkiness) and prevent degradation of the vertical resolution.

To achieve this object, according to one aspect of the present invention, a first signal including full-bandwidth components of a television horizontal transfer band is output in one field, and a second signal including only a horizontal low frequency component below a predetermined horizontal frequency of the television horizontal transfer bandwidth in an other field, whereby an input television signal with an interlace format of 2 : 1 is subjected to bandwidth compression.

According to another aspect of this invention, a horizontal low frequency component of each field of an input television signal is output for each field as a horizontal low frequency component having a bandwidth below a predetermined horizontal frequency of a television horizontal transfer bandwidth and a horizontal high frequency component included in one field of the input television signal is output repeatedly field to field as a horizontal high frequency component having a bandwidth above the predetermined horizontal frequency, whereby an input television signal in an interlace format of 2 : 1, which includes a first signal comprising a full-bandwidth component of the television horizontal transfer bandwidth in one field and a second signal comprising only the horizontal low frequency component in an other field, is subjected to bandwidth production.

With the above arrangement, of an input television signal, the horizontal low frequency component necessary to realize smooth motion is remained in both fields, thus preventing a reproduced image from having unnatural motion, so called motion-jerkiness.

In addition, since the vertical bandwidth of the horizontal low frequency component is not restricted at all, degradation of the vertical resolution can be prevented.

With the above arrangement, if the predetermined horizontal frequency is set around the center of the horizontal transfer band, bandwidth compression of about 3/4 times is possible.

BRIEF DESCRIPTION OF THE DRAWINGS

FIG. 1 is a circuit diagram illustrating the arrangement of one embodiment of a bandwidth compressing apparatus according to the present invention;

FIGS. 4A to 4H are timing charts for explaining the operation of the apparatus shown in FIG. 1;

FIG. 5 is a three-dimensional spectrum diagram illustrating an bandwidth-compressed output by the apparatus shown in FIG. 1;

FIGS. 12A to 12E are two-dimensional spectrum diagram illustrating signal spectrums at the individual portions of the apparatus shown in FIGS. 8A and 8B.

DETAILED DESCRIPTION OF THE PREFERRED EMBODIMENT

A preferred embodiment of this invention will now be described referring to the accompanying drawings.

Figure 2:
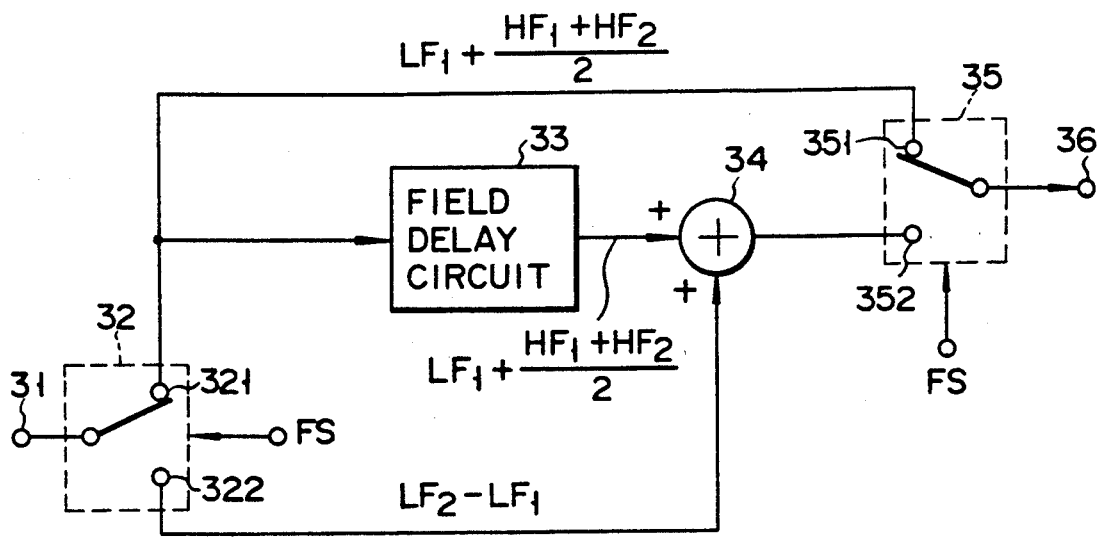
FIG. 2 is a circuit diagram illustrating the arrangement of one embodiment of a bandwidth reproducing apparatus according to the present invention.

FIG. 1 is a circuit diagram illustrating the arrangement of one embodiment of a bandwidth compressing apparatus according to the present invention. FIG. 2 is a circuit diagram illustrating the arrangement of one embodiment of a bandwidth reproducing apparatus according to the present invention.

Before describing the arrangements of the apparatuses shown in FIGS. 1 and 2, the operations of these apparatuses will be described schematically, referring to FIGS. 3A and 3B.

The following description will be given by using as a television signal a wide aspect signal of 2 : 1 interlace format with an aspect ratio of 5 : 3.

Figure 3A:
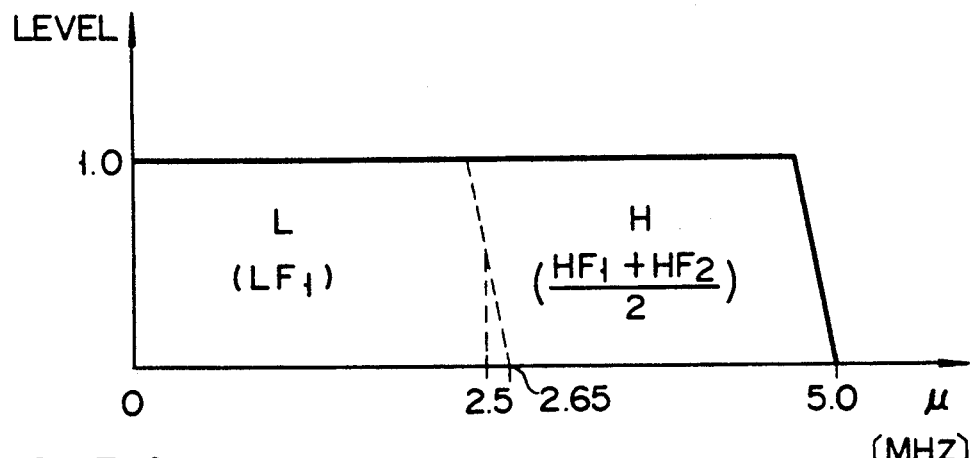
FIGS. 3A and 3B are frequency characteristic diagrams for schematically explaining the operations of the apparatuses shown in FIGS. 1 and 2.
Figure 3B:
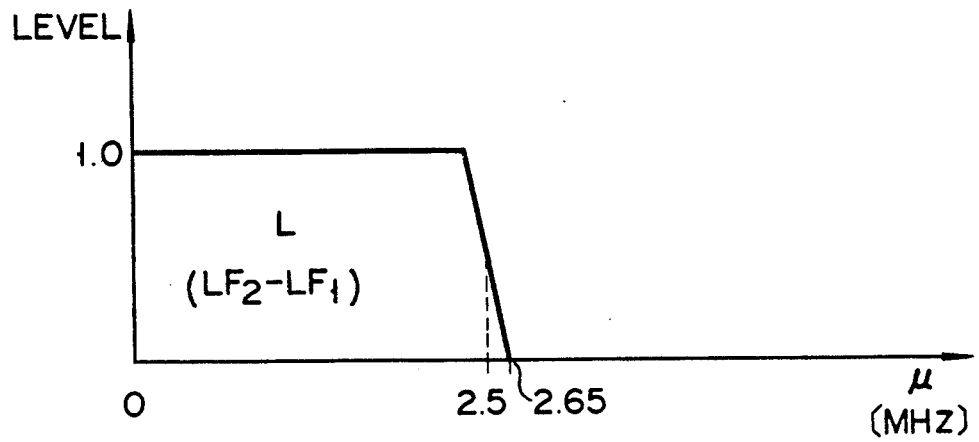

FIG. 3A is a frequency characteristic diagram illustrating a bandwidth-compressed output in one field in an output frame. Similarly, FIG. 3B is a frequency characteristic diagram illustrating a bandwidth-compressed output in the other field. In these diagrams, the horizontal scale is a horizontal frequency ($\mu$) and the vertical scale is a level.

In order for a wide aspect signal with an aspect ratio of 5 : 3 to have the same horizontal resolution as the current NTSC signal, the horizontal transfer bandwidth of the following value is necessary:

$$4 \text{ MHz} \times (5/3)/(4/3) = 5 \text{ MHz}.$$

In subjecting a wide aspect signal having such a transfer bandwidth to band compression, according to this embodiment, components of the full horizontal transfer band of an input signal are output in one field in an output frame, as shown in FIG. 3A. In the other field, a horizontal low frequency component L of a horizontal band of 0 to 2.5 MHz will be output as shown in FIG. 3B.

In this case, the horizontal low frequency component L in one field consists of a horizontal low frequency component $LF_1$ of the first field $F_1$ of the input signal, and a horizontal high frequency component H of 2.5 to 5.0 MHz consists of an average signal $S_0$ within a frame of horizontal high frequency components $HF_1$ and $HF_2$ of the first and second fields $F_1$ and $F_2$ of the input signal. The in-frame average signal $S_0$ is expressed by the following equation (1).

$$S_0 = (HF_1 + HF_2)/2 \qquad (1)$$

Accordingly, a bandwidth-compressed signal $S_1$ as expressed by the following equation (2) is acquired in one field within the output frame.

$$S_1 = LF_1 + (HF_1 + HF_2)/2 \qquad (2)$$

The horizontal low frequency component in the other field consists of a signal representing the difference between the horizontal low frequency components $LF_1$ and $LF_2$ of the first and second fields $F_1$ and $F_2$ of the input signal. Accordingly, a bandwidth-compressed signal $S_2$ as expressed by the following equation (3) is acquired in the other field.

$$S_2 = LF_2 - LF_1 \qquad (3)$$

On the band, reproducing side, at the time a field including the signal $S_1$ is input, this signal $S_1$ is output as it is. At the time a field including the signal $S_2$ is input, a signal $S_3$ attained by adding the signals $S_1$ and $S_2$ is output.

Consequently, when a field containing the signal $S_1$ is input, a bandwidth-reproduced output as given by the equation (2) is acquired, and when a field containing the signal $S_2$ is input, a bandwidth-reproduced output as given by the following equation (4) is acquired.

$$S_3 = LF_2 + (HF_1 + HF_2)/2 \qquad (4)$$

As described above, according to this embodiment, at the time of bandwidth compression, the signal $S_2$ of one of two fields is subjected to bandwidth restriction to bandwidth compress an input signal. At the time of bandwidth reproduction, a horizontal high frequency component H contained in one field is output repeatedly field to field to thereby reproduce signals $S_1$ and $S_3$ consisting of components of the full horizontal transfer bandwidth for each field.

A description will now be given of the arrangements of the apparatuses shown in FIGS. 1 and 2, which execute the above processes.

First, the arrangement of the bandwidth compressing apparatus shown in FIG. 1 will be described.

Referring to FIG. 1, numeral 11 denotes an input terminal to which a wide aspect signal of 2 : 1 interlace format is supplied. The wide aspect signal supplied to this input terminal 11 is sent to a low-pass filter (hereinafter referred to as LPF) 12 having a horizontal cut-off frequency of 2.5 MHz which in turn extracts a horizontal low frequency component L with a horizontal band of 0 to 2.5 MHz. The extracted output, horizontal low frequency component L, is illustrated in FIG. 4A in which n indicates the n-th frame and n+1 the (n+1)-th frame.

The horizontal low frequency component L extracted by the LPF 12 is supplied to an adder 13 for subtraction from the wide aspect signal supplied to the input terminal 11. As a consequence, a horizontal high frequency component H with a horizontal bandwidth of 2.5 to 5 MHz is acquired, which is illustrated in FIG. 4B.

This horizontal high frequency component H from the adder 13 is averaged over a frame by an in-frame averaging circuit 14. This process will be described below more specifically. First, the output of the adder 13 is delayed by one field (1/60 second) by a field delay circuit 15. Then, the delay output is added to a horizontal high frequency component H after one field time by an adder 16. Finally, the added output is multiplied by 1/2 by a coefficient circuit 17. Accordingly, the coefficient circuit 17 provides an in-frame average signal $S_0$ (see equation (1)) for every other field as shown in FIG. 4C.

Meantime, the horizontal low frequency component L output from the LPF 12 is delayed by one field by a field delay circuit 18 as shown in FIG. 4D. This field delay circuit 18 is provided to cope with the horizontal frequency component H being delayed by one field by the field delay circuit 15.

The output of the field delay circuit 18 is supplied to a switch circuit 19. This switch circuit 19 selects a fixed terminal 191 in a field where the horizontal low frequency component $LF_1$ of the first field $F_1$ of the input signal is output from the field delay circuit 18, and selects a fixed terminal 192 in a field where the horizontal low frequency component $LF_2$ of the second field $F_2$ is output. The switching operation causes the horizontal low frequency component $LF_1$ from the field delay circuit 18 to be supplied via the switch circuit 19 to an adder 20 and a field delay circuit 21.

The horizontal low frequency component $LF_1$ supplied to the adder 20 is added to the in-frame average signal $S_0$ from the in-frame average circuit 14. Consequently, the adder 20 outputs the signal $S_1$ given by the equation (2) every other field as shown in FIG. 4F.

The horizontal low frequency component $LF_2$ from the field delay circuit 18 is supplied through the switch circuit 19 to an adder 22. This adder 22 is also supplied with the horizontal low frequency component $LF_1$ delayed by one field by the field delay circuit 21. The horizontal low frequency component $LF_1$ is subtracted from the horizontal low frequency component $LH_2$ of the present field by the adder 22. As a result, the adder 22 outputs the signal $S_2$ given by the equation (3) every other field as shown in FIG. 4G. Of course, the output timing for this signal $S_2$ is shifted by one field from that for the signal $S_1$.

The outputs of the adders 20 and 22 are respectively supplied to fixed terminals 231 and 232 of a switch circuit 23. This switch circuit 23 selects the fixed terminal 231 in a field where the signal $S_1$ is output, and selects the other fixed terminal 232 in a field where the signal $S_2$ is output. Accordingly, the signals $S_1$ and $S_2$ appear at an output terminal 24 alternately every other field as shown in FIG. 4H.

The connecting states of the switch circuits 19 and 23 are controlled by a field select signal FS whose level is switched between high and low levels between field periods.

FIG. 5 is a three-dimensional spectrum diagram illustrating the bandwidth-compressed output appearing at the output terminal 24, in three directions, horizontal ($\mu$), vertical (v) and time (t).

As illustrated, according to the arrangement in FIG. 1, the horizontal low frequency component L has no bandwidth restriction with respect to both the vertical (v) and time (t) directions, whereas only the horizontal high frequency component H is bandwidth-restricted by 1/2 with respect to both the vertical (v) and time (t) directions.

A description will now be given of the arrangement of the band reproducing apparatus shown in FIG. 2.

Figures 6A, 6B, 6C, 6D:
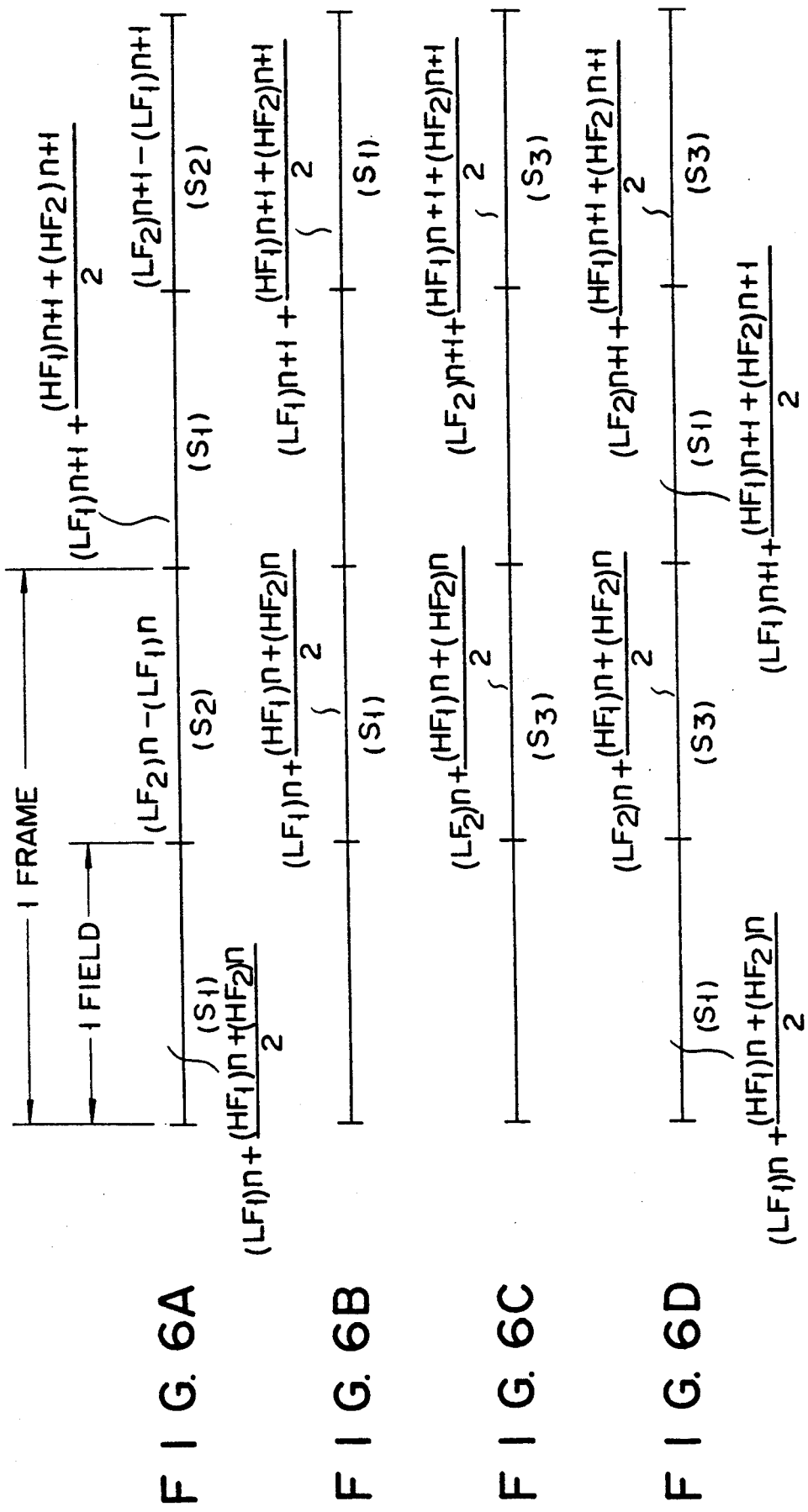
FIGS. 6A to 6D are timing charts for explaining the operation of the apparatus shown in FIG. 2.

Referring to FIG. 2, numeral 31 is an input terminal to which a bandwidth-compressed wide aspect signal is supplied. FIG. 6A illustrates the wide aspect signal supplied to this input terminal 31.

This wide aspect signal is then supplied to a switch circuit 32. This switch circuit 32 selects a fixed terminal 321 in a field where the signal $S_1$ is input and selects another fixed terminal 322 in a field where the signal $S_2$ is input.

In the input field of the signal $S_1$, therefore, this signal is supplied via the switch circuit 32 to a field delay circuit 33 and a switch circuit 35. This switch circuit 35 selects its fixed terminal 351 in the input field of the signal $S_1$ and selects another fixed terminal 352 in the input field of the signal $S_2$.

In the input field of the signal $S_1$, therefore, this signal is supplied via the switch circuits 32 and 35 to an output terminal 36. In the input field of the signal $S_2$, this signal $S_2$ is supplied via the switch circuit 32 to an adder 34. The signal $S_1$ (see FIG. 6B) of the previous field delayed by one field by the field delay circuit 33, is also supplied to the adder 34 and is added to the signal $S_2$. In the input field of the signal $S_2$, therefore, the signal $S_3$ given by the equation (4) is output from the adder 34 as shown in FIG. 6C. This signal $S_3$ is supplied through the switch circuit 35 to the output terminal 36. As a result, the signal $S_1$ and $S_3$ would appear at the output terminal 36 alternately every other field as shown in FIG. 6D.

The connecting states of these switch circuits 32 and 35 are also controlled by the field select signal FS.

According to the above-described embodiment, an input signal can be bandwidth-compressed to 3/4.

This is because that in one field of the output frame, the components of the full horizontal transfer bandwidth of the input signal are output, and in the other field, only the horizontal low frequency component L, a half of the full horizontal transfer bandwidth is output.

This embodiment can realize bandwidth compression which does not cause unnatural movements. This is because that the horizontal low frequency components $LF_1$ and $LF_2$ in both fields $F_1$ and $F_2$ are all left as the horizontal low frequency component L necessary to provide smooth motion. That is, with the above arrangement, all the movement components including a quick movement component of a time frequency of 30 Hz can all be left with respect to the horizontal low frequency component L, as shown in FIG. 5.

It is confirmed through experiments that components having a horizontal bandwidth of 0 to 2.5 MHz, like the horizontal low frequency component L in this embodiment, is essential to provide smooth motion. This will be further described referring to FIG. 7.

Figure 7:
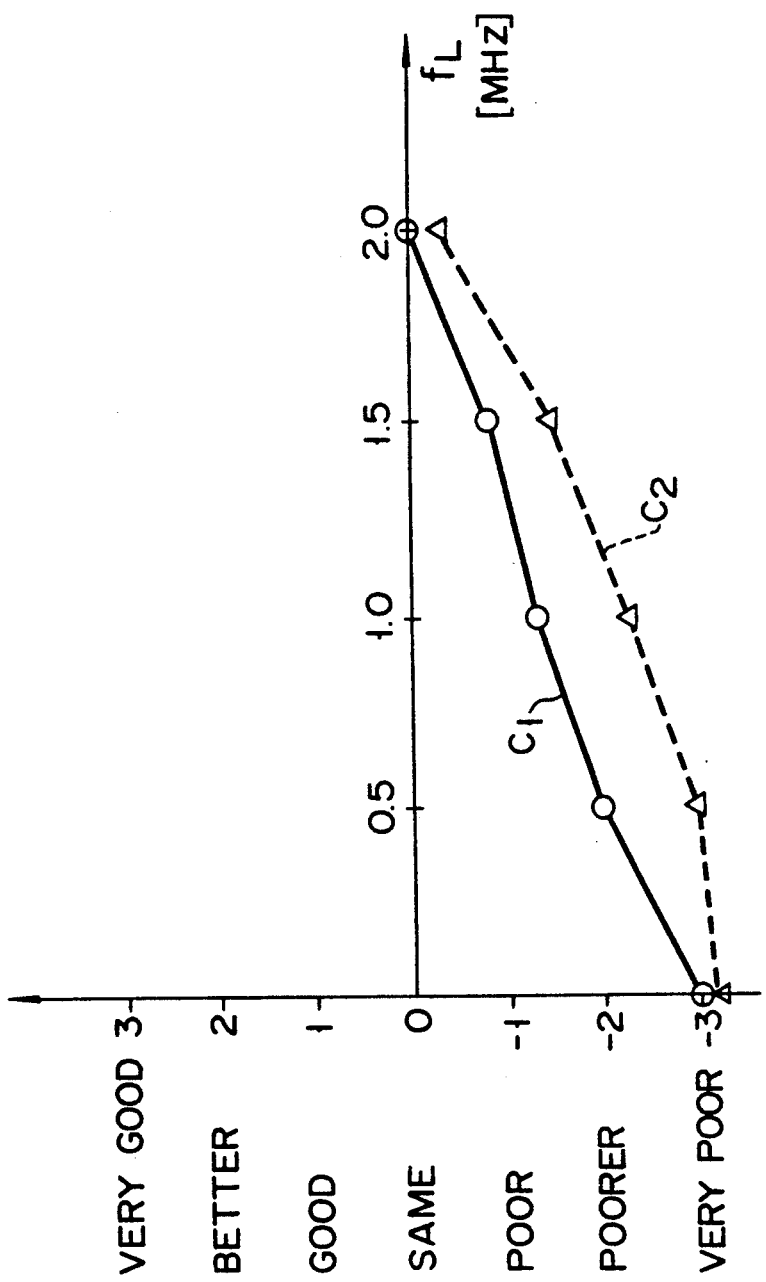
FIG. 7 is a characteristic diagram for explaining the effects of the apparatuses shown in FIGS. 1 and 2.

FIG. 7 illustrates the results of evaluation through visual experiments whether or not unnatural motion occur when the horizontal high frequency component H is subjected to bandwidth restriction. The horizontal scale indicates the lower limit frequency $f_L$ of the horizontal high frequency component H, and the vertical scale evaluation categories. The categories are divided into seven stages from "very poor" to "very good."

Referring to this diagram, the characteristic curve $C_1$ indicates the evaluation result of the case where the in-frame average signal $S_0$ of the horizontal high frequency component H is output repeatedly field to field as per this embodiment. A characteristic curve $C_2$ the horizontal high frequency component H in one field is output repeatedly field to field. A characteristic curve for the case where no bandwidth restriction is given to the horizontal high frequency component H is the same as the horizontal axis.

It should be understood from FIG. 7 that as the lower limit frequency $f_L$ of the horizontal high frequency component H under bandwidth restriction gets higher, unnatural motion is reduced. When the lower limit frequency $f_L$ reaches 2.0 MHz, the same effect as produced in a case of no bandwidth restriction being made can be attained. According to the arrangement as in this embodiment which sets the lower limit frequency $f_L$ of the horizontal high frequency component H to 2.5 MHz, higher than 2.0 MHz, the horizontal low frequency component L contains all the components necessary to provide smooth motion.

This embodiment can also realize the bandwidth compression without degrading the vertical resolution because no bandwidth restriction is given to the horizontal low frequency component L with respect to the vertical direction, as shown in FIG. 5.

Further, the embodiment can prevent a reproduced image from an overlapped image at the edge portions in the horizontal direction.

This is because that the in-frame average signal $S_0$ is used as the horizontal high frequency component H. In other words, the above-described arrangement suppresses a movement component in a horizontal high frequency region where the horizontal edge portions exist, as shown in FIG. 5. Such suppression has no influence on smooth motion because the lower limit frequency $f_L$ of the horizontal high frequency component H is set to 2.5 MHz as mentioned above.

According to the embodiment, in reproducing the bandwidth of the signals $S_2$, the components of the full horizontal transfer bandwidth can be reproduced through an adding process since the difference signal of the horizontal low frequency components L between fields is used as the signal $S_2$.

The embodiment can also effectively apply to analog transmission due to all the processes being done in analog manner. This feature can cope with the case where reception conditions are likely to be deteriorated as in ground broadcasting.

Figure 8A:
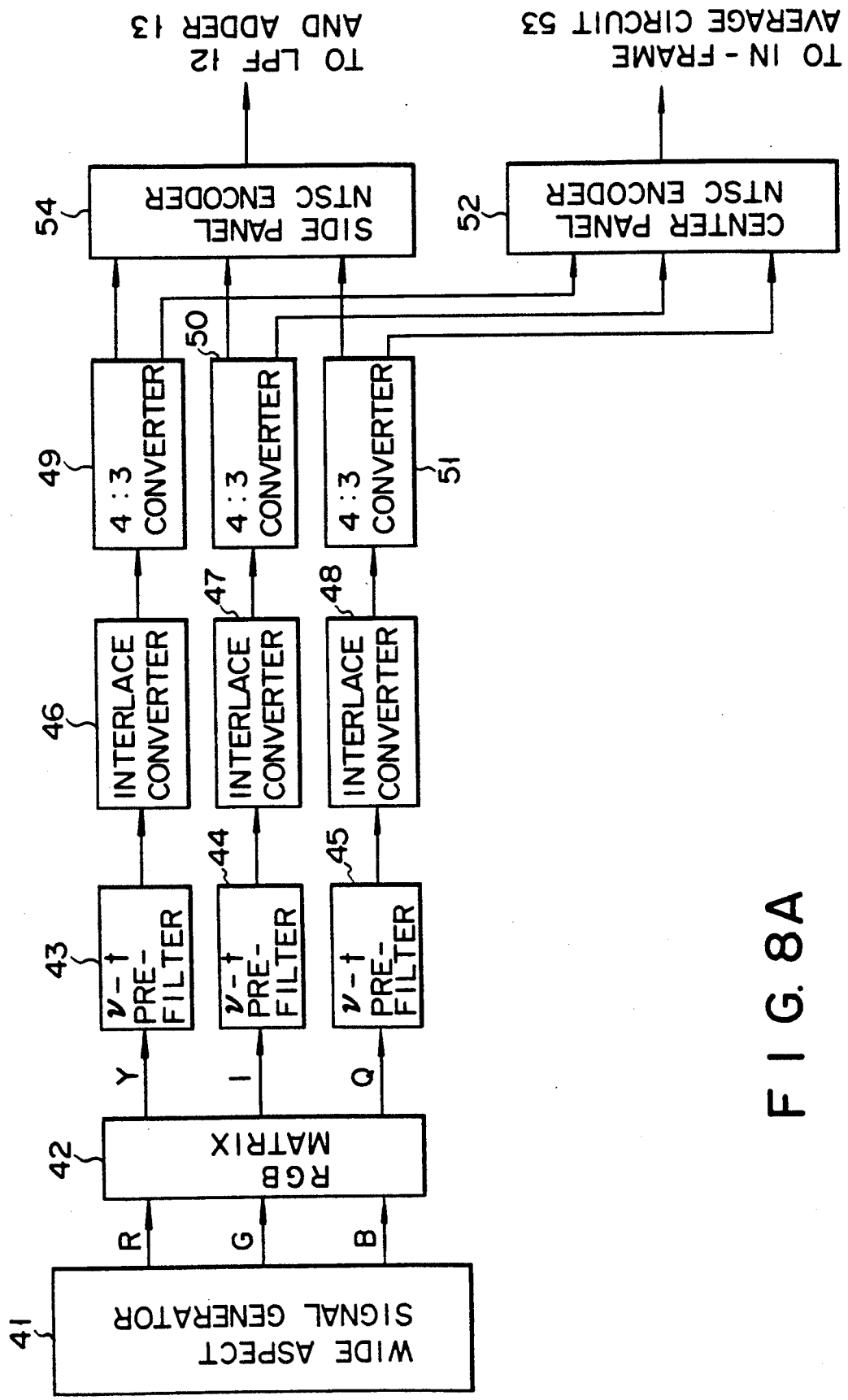
FIGS. 8A and 8B are circuit diagrams illustrating the arrangement of one embodiment of a multiplexer for multiplexing a bandwidth-compressed added signal according to this invention.
Figure 8B:
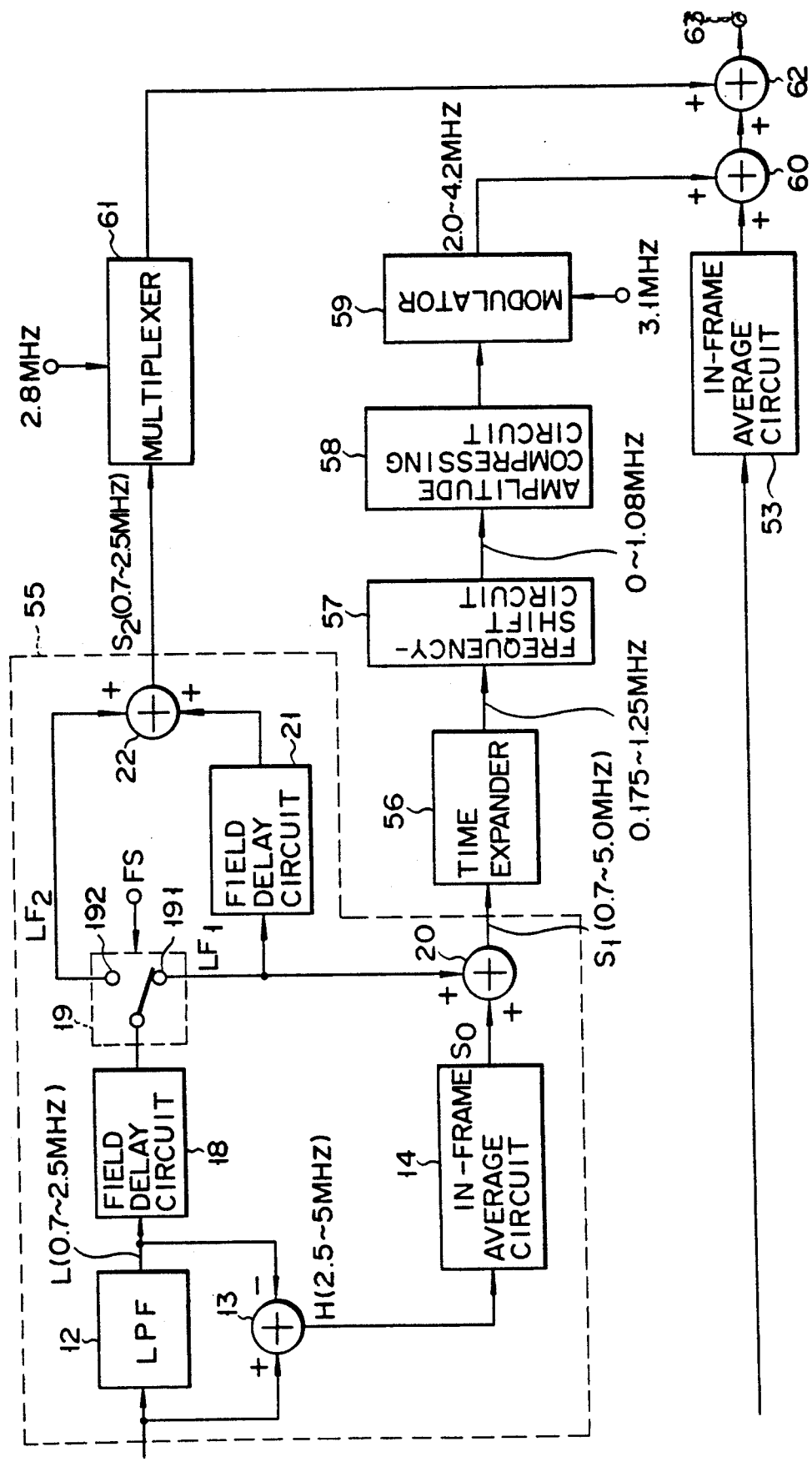

FIGS. 8A and 8B are circuit diagrams illustrating the arrangement of one embodiment of a multiplexer for multiplexing band-compressed added signals, according to this invention.

The illustrated multiplexer is an added signal multiplexer of the aforementioned ACTV system, which is designed to multiplex the main signal with the added signal that is band-compressed by the bandwidth compressing apparatus embodying this invention.

Referring to FIG. 8A, numeral 41 is a wide aspect signal generator. A wide aspect signal output from this signal generator 41 is a non-interlace signal with 525 scan lines and an aspect ratio of 5 : 3. This non-interlace signal is output as the primary color (R, G and B) signal, and is converted into Y, I and Q signals by a matrix circuit 42. After having their unnecessary components removed by pre-filters 43, 44 and 45 in the vertical (v) and time (t) directions, these Y, I and Q signals converted into signals of 2 : 1 interlace format by interlace converters 46, 47 and 48. The interlaced Y, I and Q signals are each divided into a center panel signal (main signal) representing the center portion of a screen and a side panel signal (added signal) representing both edge portions of the screen by means of 4 : 3 converters 49, 50 and 51. In this case, that component of 0 to 0.7 MHz of the side panel signal is multiplexed with the horizontal overscan region of the center panel signal under time-compressed state.

The center panel signal having the side panel signal of 0 to 0.7 MHz multiplexed therewith is converted into an NTSC signal by an NTSC encoder 52 for exclusive use for the center panel. The NTSC signal is subjected to in-frame averaging by an in-frame average circuit 53 shown in FIG. 8B. It should be noted that this in-frame averaging is done only on a component with a horizontal frequency equal to or greater than 1.5 MHz. This averaging causes an empty region where part of the side panel signal of 0.7 to 5.0 MHz is multiplexed, which will be described later.

The component of 0.7 to 5.0 MHz of the side panel signal is converted into an NTSC signal by an NTSC encoder 54 (see FIG. 8A) for specific use for the side panel. This NTSC signal is subjected to bandwidth compression by a bandwidth compressing circuit 55 as shown in FIG. 8B. This bandwidth compressing circuit 55 has the substantially same structure as the bandwidth compressing apparatus as shown in FIG. 1; the only difference is that the former circuit does not have the switch circuit 23. For ease of understanding, therefore, the same reference numerals as used in FIG. 1 will be used to specify the identical or corresponding portions in the bandwidth compressing circuit 55.

Figure 9A:
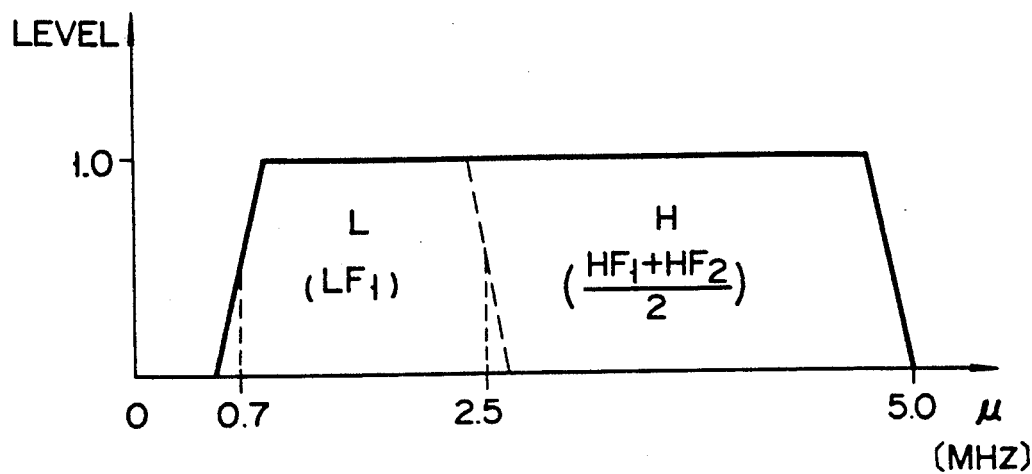
FIGS. 9A and 9B are frequency characteristic diagrams for explaining the operations of the apparatus shown in FIGS. 8A and 8B.
Figure 9B:
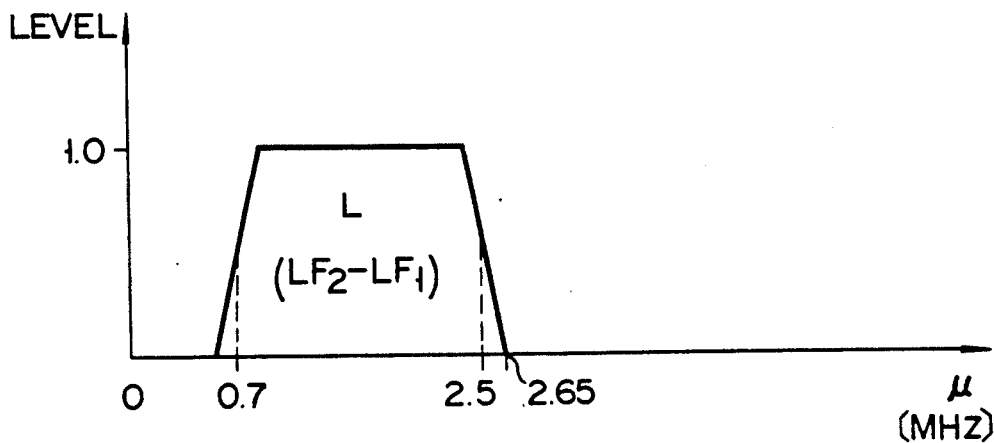

The side panel signal of 0.7 to 5 MHz output from the NTSC encoder 54 is separated into a horizontal low frequency component L of 0.7 to 2.5 MHz and a horizontal high frequency component H of 2.5 to 5 MHz by means of the LPF 12 and adder 13. Based on the separated outputs, the signal $S_1$ as shown in FIG. 9A is attained by the adder 20, and the signal $S_2$ as shown in FIG. 9B is attained by the adder 22.

The signal $S_1$ from the adder 20 is expanded four times with respect to time by a time expander 25, thus providing a signal with an aspect ratio of 4 : 3 and a horizontal band of 0.175 to 1.25 MHz. This signal is frequency-shifted to a low frequency region by a frequency shifting circuit 57 to be a signal having a horizontal band of 0 to 1.08 MHz. This signal is subjected to amplitude compression by an amplitude compressing circuit 58. The compressed output is frequency-shifted by a modulator 59 to a region which is made empty through the in-frame averaging by the in-frame average circuit 53. The resultant output is multiplexed with the center panel signal from the circuit 53 by an adder 60.

The signal $S_2$ from the adder 22 is subjected to a process for multiplexing in the vertical overscan region of the main signal by a vertical overscan multiplexing circuit 61. The processed output is then multiplexed by an adder 62 in the vertical overscan region of the center panel signal from the adder 60.

Figure 10:
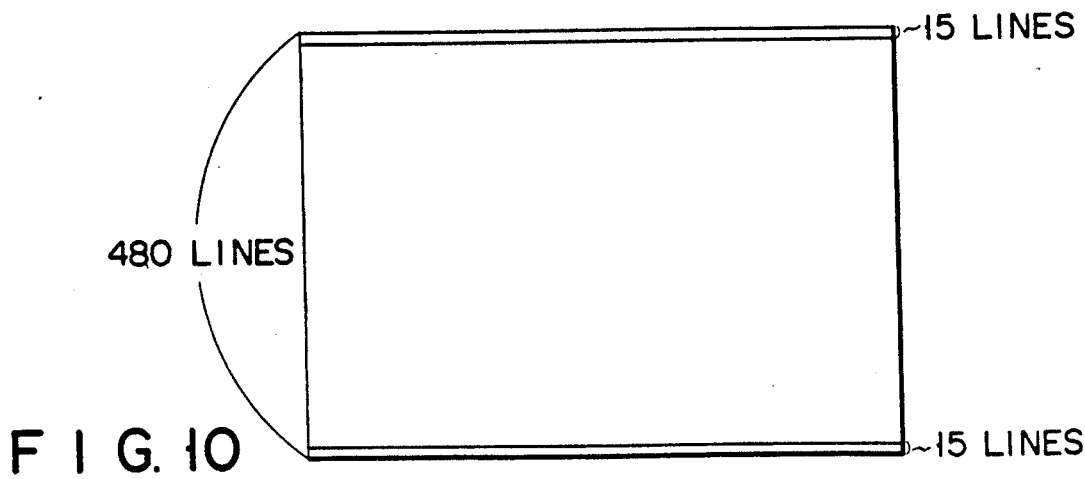
FIG. 10 is a diagram for explaining the operation of the apparatus shown in FIGS. 8A and 8B.

FIG. 10 is a diagram for explaining this multiplexing region. The signal output from the adder 22 has a bandwidth which has about a half size of the full horizontal transfer bandwidth as shown in FIG. 9B. In order to multiplex this signal $S_2$, therefore, of 525 scan lines per frame, the top and bottom 15 lines are needed. This number of the scan lines corresponds to about 6.25% of the effective scan lines. Therefore, the multiplexing region corresponds to the overscan region in an ordinary television receiver, and causes practically no interference a displayed image.

The center panel signal having the side panel signal multiplexed there with is transmitted to the receiver side from the sending unit (not shown) coupled to an output terminal 63.

Figure 11:
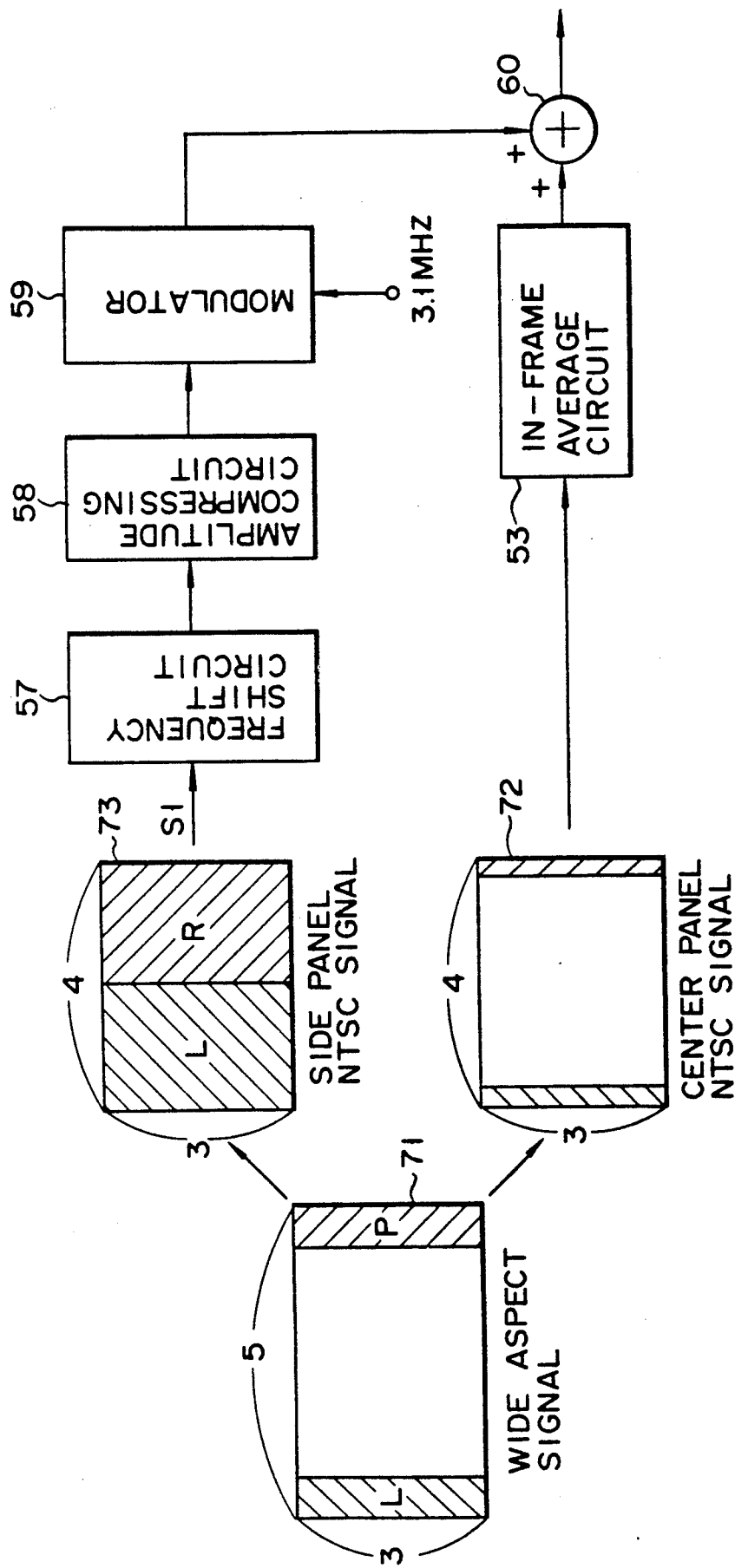
FIG. 11 is a diagram illustrating signal forms at the individual portions of the apparatus shown in FIGS. 8A and 8B.

FIG. 11 is a diagram illustrating signals of the individual portions in the circuits shown in FIGS. 8A and 8B.

Referring to FIG. 11, numeral 71 is a signal with an aspect ratio of 5 : 3 output from the wide aspect signal generator 41. The hatched portions indicate the side panel signal and the other portion the center panel signal.

Numeral 72 indicates a center panel signal with an aspect ratio of 4 : 3 output from the 4 : 3 converters 49, 50 and 51. The hatched portions here indicate the side panel signal of 0 to 0.7 MHz multiplexed in the horizontal overscan portion.

Numeral 73 is a side panel signal of 0.7 to 5.0 MHz converted by the time expander 56 to have an aspect ratio of 4 : 3.

The signal 72 is subjected to a process for providing an in-frame average of the component of 1.5 MHz or above by the in-frame average circuit 53, it is supplied to the adder 60. The signal 73 is positioned in the aforementioned empty region by the frequency-shifting circuit 57, amplitude compressing circuit 58 and modulator 59 it is then multiplexed with the center panel signal.

FIGS. 12A to 12E illustrate the signal spectrums of at the individual portions in FIGS. 8A and 8B.

FIG. 12A illustrates a two-dimensional spectrum of the horizontal ($\mu$) - vertical (v) of the center panel signal from the NTSC encoder 52. The hatched portions here indicate components of 1.5 MHz or above which are subjected to in-frame averaging by the in-frame average circuit 53.

FIG. 12B illustrates a two-dimensional spectrum of the horizontal ($\mu$) - vertical (v) of the center panel signal having been subjected to in-frame averaging by the in-frame average circuit 53. As illustrated, this signal has its vertical bandwidth subjected to band restriction to 525/4 (cph) at and above 1.5 MHz.

FIG. 12C illustrates a two-dimensional spectrum of the horizontal ($\mu$) - vertical (v) of the side panel signal from the NTSC encoder 54. The hatched portions here indicate components of 0.7 to 5.0 MHz output from the NTSC encoder 54, and the other portion indicates a component of 0 to 0.7 MHz to be multiplexed in the horizontal overscan region of the center panel signal.

FIG. 12D illustrates a two-dimensional spectrum of the horizontal ($\mu$) - vertical (v) of the side panel signal output from the frequency shift circuit 57. As illustrated, the vertical bandwidth of this signal is subjected to band restriction to 525/4 (cph) at and above 1.5 MHz.

The signal shown in FIG. 12D is multiplexed with the center panel signal using the region made empty by the in-frame averaging process, as shown in FIG. 12E.

According to the above embodiment, since the side panel signal is subjected to bandwidth compression using the bandwidth compressing apparatus shown in FIG. 1, it is possible to prevent unnatural motion and degradation of the vertical resolution from occurring on a reproduced image of this side panel signal.

The reason why the bandwidth compression by the band compressing apparatus in FIG. 1 is not utilized in bandwidth compression of the center panel signal is that this signal is for keeping the compatibility with the current NTSC system. If the center panel signal is not necessary to keep the compatibility with the current NTSC system, the signal may also be subjected to band compression by the bandwidth compressing apparatus shown in FIG. 1.

The present invention should not in any way be restricted to the above-described particular embodiments.

For instance, although the embodiments have been described with reference to a case where the boundary frequency between the horizontal high frequency component H and the horizontal low frequency component L is set to 2.5 MHz, it may be set to other frequencies as well.

Although the embodiments have been described with reference to a case where the in-frame average signal $S_0$ is used as the horizontal high frequency component H, the horizontal high frequency component H in either field may be used.

Further, although the embodiments have been described with reference to a case where the difference signal between fields is used as the horizontal low frequency component L for that field in which only the horizontal low frequency component L is output, the horizontal low frequency component L for one field may be used instead. In this case, it is unnecessary to perform an adding process for extracting the horizontal low frequency component L of that field which contain only the horizontal low frequency component L from the signal of this field on the band reproducing side. In other words, the signal of that field may directly be used as the horizontal low frequency component L of the bandwidth-reproduced output of that field, whereas the horizontal high frequency component H of that field may be obtained by extracting a horizontal high frequency component H from the signal of the adjacent field which contains the components of the full horizontal transfer bandwidth and delaying it by one field.

The present invention may be modified in various manners without departing the scope and spirit of the invention.

In short, the present invention can apply to any system as long as the components of the full horizontal transfer band are output in one field and only the horizontal low frequency component is output in the other field, thereby subjecting a television signal to bandwidth compression. Further, the present invention can apply to a system in which the horizontal low frequency component L inserted in each field is output as the horizontal low frequency component L, and the horizontal high frequency component H inserted in one of the fields is output as the horizontal high frequency component H repeatedly field to field, thereby reproducing the bandwidth of the bandwidth-compressed television signal.

As described above, this invention can subject a television signal to bandwidth compression without causing unnatural motion or deterioration of the vertical resolution.

What is claimed is:

1. A bandwidth compressing/ reproducing system comprising:
   first signal output means for receiving a television signal of 2 : 1 interlace format, and outputting in one field a first signal consisting of full-bandwidth components of a horizontal transfer bandwidth of said received television signal;
   signal extracting means for extracting a horizontal low frequency component, having a bandwidth of a predetermined horizontal frequency or below, from said television signal;
   second signal output means for outputting, in an other field, a second signal consisting only of said horizontal low frequency component output from said signal extracting means;
   adding means for adding said first and second signals output from said first and second signal output means; and
   selection means for selecting said first signal from said first signal output means in said one field whereas selecting an added output from said adding means in said other field;
   wherein said predetermined horizontal frequency is such that said horizontal low frequency component contains a component necessary to provide smooth motion.

2. A bandwidth compressing apparatus comprising:
   first signal output means for receiving a television signal of 2 : 1 interlace format, and outputting in one field a first signal consisting of full-bandwidth components of a horizontal transfer bandwidth of said received television signal;
   signal extracting means for extracting from said television signal a horizontal low frequency component having a bandwidth of a predetermined horizontal frequency or below; and
   second signal output means for outputting, in an other field, a second signal consisting only of said horizontal low frequency component output from said signal extracting means;
   wherein said predetermined horizontal frequency is such that said horizontal low frequency component contains a component necessary to provide smooth motion.

3. An apparatus according to claim 2, wherein said first signal output means outputs an in-frame average signal as a horizontal high frequency component having a bandwidth of said predetermined horizontal frequency or above of said first signal.

4. An apparatus according to claim 2, wherein said second signal output means outputs as said second signal a field-to-field difference signal representing a difference in said horizontal low frequency component between fields.

5. An apparatus according to claim 2, wherein said first output means comprises:
   first subtracting means for performing a subtraction between said television signal and said horizontal low frequency component output from said signal extracting means, to output a horizontal high frequency component having a bandwidth equal to or greater than said predetermined horizontal frequency;
   in-frame averaging means for subjecting a subtracted output of said first subtracting means to in-frame averaging; and
   adding means for adding an in-frame average output from said in-frame averaging means and said horizontal low frequency component of said one field output from said signal extracting means;
   and wherein said second signal output means comprises:
   delay means for delaying by one field said horizontal low frequency component of said one field output from said signal extracting means; and
   second subtracting means for performing a subtraction between a delayed output of said delay means and said horizontal low frequency component of said other field output from said extracting means, to thereby output said field-to-field difference signal of said horizontal low frequency component.

6. An apparatus according to claim 2, further comprising selection means for selecting said first signal from said first signal output means in said one field and selecting said second signal from said second signal output means in said other field.

7. A bandwidth-compressed added signal multiplexer comprising:
    signal dividing means for dividing a television signal of 2 : 1 interlace format having a first aspect ratio into a main signal having a second aspect ratio smaller than said first aspect ratio and an added signal attained by removing said main signal from said television signal;
    in-frame averaging means for subjecting to in frame averaging that component of said main signal from said signal dividing means which has a bandwidth equal to or greater than a first predetermined horizontal frequency;
    bandwidth compressing means for outputting in one field a first signal consisting of full bandwidth components of a horizontal transfer bandwidth of said added signal, and outputting in an other field a second signal consisting only of a horizontal low frequency component having a bandwidth below a second predetermined horizontal frequency of said added signal, to thereby bandwidth compress said added signal;
    first multiplexing means for frequency-multiplexing said first signal from said bandwidth compressing means with said main signal output from said in-frame average means; and
    second multiplexing means for multiplexing said second signal output from said bandwidth compressing means in an overscan region of said main signal output from said in-frame averaging means.

8. A bandwidth reproducing apparatus comprising:
    adding means for adding, field by field, an input television signal of 2 : 1 interlace format including a first signal consisting of full-bandwidth components of a television horizontal transfer bandwidth in one field, and a second signal consisting only of a horizontal low frequency component below a predetermined horizontal frequency of said television horizontal transfer bandwidth in an other field; and
    selection means for selecting said input television signal in said one field and selecting an added output of said adding means in said other field;
    wherein said predetermined horizontal frequency is such that said horizontal low frequency component contains a component necessary to provide smooth motion.

9. An apparatus according to claim 8, wherein said second signal is a field-to-field difference signal representing difference in said horizontal low frequency component between fields.

10. An apparatus according to claim 8, wherein a horizontal high frequency component having a bandwidth equal to or greater than said predetermined horizontal frequency of said first signal is an in-frame average signal.

11. An apparatus according to claim 8, wherein said adding means comprises:
    delay means for delaying said input television signal by one field; and
    adding means for adding said input television signal and a delayed output of said delay means.

12. A band compressing method comprising the steps of:
    outputting a first signal consisting of full-bandwidth components of a television horizontal transfer bandwidth of an input television signal having an interlace format 2 : 1 in one field;
    outputting a second signal consisting only of a horizontal low frequency component below a predetermined horizontal frequency of said television horizontal transfer bandwidth in another field;
    wherein said predetermined horizontal frequency is such that said horizontal low frequency component contains a component necessary to provide smooth motion.

13. A bandwidth reproducing method comprising the steps of:
    outputting a horizontal low transfer component of each field of an input television signal for each field as a horizontal low frequency component having a bandwidth below a predetermined horizontal frequency of a television horizontal transfer bandwidth;
    outputting a horizontal high frequency component included in one field of said input television signal repeatedly field to field as a horizontal high frequency component having a bandwidth above said predetermined horizontal frequency;
    whereby said input television signal has an interlace format of 2 : 1, which includes a first signal comprising a full-bandwidth component of said television horizontal transfer bandwidth in one field and a second signal comprising only said horizontal low frequency component in an other field;
    wherein said predetermined horizontal frequency is such that said horizontal low frequency component contains a component necessary to provide smooth motion.

* * * * *